(12) United States Patent
Prouvost

(10) Patent No.: US 7,729,356 B2
(45) Date of Patent: Jun. 1, 2010

(54) SYSTEM AND METHOD FOR TRANSMITTING A MULTIMEDIA MESSAGE

(75) Inventor: Denis Prouvost, Paris (FR)

(73) Assignee: France Telecom, Paris (FR)

( * ) Notice: Subject to any disclaimer, the term of this patent is extended or adjusted under 35 U.S.C. 154(b) by 397 days.

(21) Appl. No.: 10/571,974

(22) PCT Filed: Sep. 15, 2003

(86) PCT No.: PCT/FR03/02718

§ 371 (c)(1),
(2), (4) Date: May 30, 2006

(87) PCT Pub. No.: WO2005/029795

PCT Pub. Date: Mar. 31, 2005

(65) Prior Publication Data

US 2007/0067408 A1  Mar. 22, 2007

(51) Int. Cl.
*H04L 12/28* (2006.01)
(52) U.S. Cl. .................. 370/395.1; 370/300; 370/277; 709/203
(58) Field of Classification Search .............. 370/352, 370/337, 217, 329, 466, 506
See application file for complete search history.

(56) References Cited

U.S. PATENT DOCUMENTS

| | | | | |
|---|---|---|---|---|
| 6,035,339 | A * | 3/2000 | Agraharam et al. | 709/246 |
| 6,718,168 | B2 * | 4/2004 | Ala-Luukko et al. | 455/412.1 |
| 6,885,870 | B2 * | 4/2005 | Aho | 455/466 |
| 6,947,738 | B2 * | 9/2005 | Skog et al. | 455/426.1 |
| 7,116,995 | B2 * | 10/2006 | Savinen et al. | 455/466 |
| 7,298,760 | B2 * | 11/2007 | Katibian et al. | 370/464 |
| 7,308,697 | B1 * | 12/2007 | Jerding et al. | 725/34 |
| 2002/0044634 | A1 | 4/2002 | Rooke et al. | |
| 2002/0132608 | A1 * | 9/2002 | Shinohara | 455/412 |
| 2003/0040300 | A1 * | 2/2003 | Bodic et al. | 455/412 |
| 2003/0065802 | A1 * | 4/2003 | Vitikainen et al. | 709/231 |
| 2003/0172173 | A1 | 9/2003 | Fenton | |
| 2003/0187930 | A1 * | 10/2003 | Ghaffar et al. | 709/205 |
| 2003/0236892 | A1 * | 12/2003 | Coulombe | 709/228 |
| 2004/0049574 | A1 * | 3/2004 | Watson et al. | 709/224 |
| 2006/0293068 | A1 * | 12/2006 | Svensson et al. | 455/466 |

FOREIGN PATENT DOCUMENTS

| | | | |
|---|---|---|---|
| EP | 0 804 045 A2 | 10/1997 | |
| EP | 1 128 691 A2 | 8/2001 | |

* cited by examiner

*Primary Examiner*—Huy D Vu
*Assistant Examiner*—Zewdu Beyen
(74) *Attorney, Agent, or Firm*—Drinker Biddle & Reath LLP

(57) ABSTRACT

This invention relates to a telecommunications system for transmitting multimedia messages from a first telecommunications terminal to a second telecommunications terminal via a telecommunications network. The inventive system comprises a message server provided for receiving the messages from the first terminal and for transmitting them to the second telecommunications terminal. The message server comprises means for developing a message broadcasting program to be downloaded by the second terminal for broadcasting the messages according to the characteristics of said second terminal.

20 Claims, 3 Drawing Sheets

SYSTEM AND METHOD FOR TRANSMITTING A MULTIMEDIA MESSAGE

CROSS-REFERENCE TO RELATED APPLICATIONS

This application is the U.S. national phase of the International Patent Application No. PCT/FR2003/002718 filed Sep. 15, 2003, the entire content of which is incorporated herein by reference.

BACKGROUND OF THE INVENTION

The invention concerns telecommunications systems and in particular relates to transmitting multimedia messages from a first telecommunications terminal to a second telecommunications terminal by using a telecommunications network.

The invention in particular applies to transmitting messages to a mobile telephone set, but also generally to transmitting multimedia messages to any type of telecommunications terminal of the telephone set, personal assistant (PDA), microcomputer type, . . .

As conceivable, transmitting of multimedia messages, in particular towards mobile type telephone handsets or to personal assistants, generates problems for restoring messages to the extent that for reasons of bulkiness, man-machine interfaces with which such terminals are provided, do not allow the whole of the information contained in such messages to be clearly restored. This problem is increasingly posed when the message is elaborated from a microcomputer and is intended for a mobile cell telephone. Indeed, in this case, the message must be converted into a format compatible with the end terminal in order to be able to suitably restore the whole of the information contained in the message.

Moreover, implementation of a multimedia messaging service MMS, which allows the users of mobile units to receive or send messages which may contain text, images and sound, involves the use of software client stored onboard the mobile unit in order to load and restore messages. Now, such a client is difficult to develop. A given version of the client MMS supports the whole of the provided functionalities. In the case of adding new functionalities to the MMS service, a user carrying a mobile set in which a preceding version of the client MMS is loaded, will not be able to benefit from the new functionalities. In addition, in the case of failure of the onboard software client expressed by faulty operations, it is difficult to correct these faults from a distance.

Finally, there are different implementations of client MMSes, so that it is not possible to provide the guarantee to the originator that the message which he/she has composed, will exactly be displayed in the same way on all the mobiles to which his/her MMS message is addressed.

In view of the above, the object of the invention is to provide a method for a telecommunications system with which the aforementioned drawbacks may be overcome.

SUMMARY OF THE INVENTION

According to the invention, a telecommunications system for transmitting multimedia messages from a first telecommunications terminal to a second telecommunications terminal via a telecommunications network is therefore provided, comprising a message server provided for receiving messages from the first terminal and for transmitting them to the second telecommunications terminal.

The message server includes means for elaborating a program for broadcasting messages intended to be downloaded by the second terminal in order to broadcast the messages according to the characteristics of said second terminal.

Thus, the message broadcasting program which undertakes to display the messages defined by the originators, and which is elaborated on demand from end users according to the characteristics of the terminal, is updated permanently and it allows the message to be adapted to the nature of the different end terminals.

According to another feature of the telecommunications system according to the invention, the system further includes a short message service centre for transmitting a message notification to the second terminal after receiving a message via the message server.

According to another feature of the invention, the message server includes means for identifying the type of terminal to which a message is addressed and a database in which a set of characteristics of said terminal is loaded for each type of terminal, the broadcasting program being elaborated by the message server according to the characteristics of the second identified terminal.

For example, the first terminal includes an Internet browser which is used for elaborating messages.

Alternatively, the first terminal includes a software application for creating messages, downloaded beforehand, stored in memory in a hardware resource management platform of said terminal.

According to an advantageous embodiment, the message server communicates with a database of a telecommunications operator for elaborating the broadcasting program from data relating to the first terminal or to the bearer of the first terminal, extracted from the database.

Further, according to another feature of the invention, the broadcasting program may include instruction codes capable of causing the display on a screen of the second terminal, of a menu for selecting procedures to be executed by said second terminal and initiating execution of said procedures.

According to the invention, a method for transmitting a multimedia message from a first telecommunications terminal to a second telecommunications terminal, via a telecommunications network by means of a telecommunications system as defined above, is also provided, characterized in that it includes the following steps:

elaborating said message by means of the first telecommunications terminal;

transmitting the message to the message server;

transmitting a message notification to the second terminal;

emitting via the second terminal a request for broadcasting said message;

elaborating a message broadcasting program in response to the broadcasting request depending on the characteristics of the second terminal;

downloading the broadcasting program; and applying the broadcasting program.

According to an embodiment, during the step for elaborating the broadcasting program, a field containing an indication of the terminal type to which the second terminal belongs, is extracted from the broadcasting request, the broadcasting program being elaborated from characteristics of the second terminal extracted from a database in which a set of characteristics of said terminal is loaded for each type of terminal.

According to another feature of the method according to the invention, the notification of the message is performed by transmitting a short message via a short message service centre.

According to an advantageous embodiment, the broadcasting program is elaborated from data extracted from a database of a telecommunications operator in which information relating to the first terminal or to the bearer of said first terminal is stored.

BRIEF DESCRIPTION OF THE DRAWINGS

Other objects, features and advantages of the invention will become apparent upon reading the following description, only given as a non-limiting example and made with reference to the appended drawings wherein.

DETAILED DESCRIPTION OF THE INVENTION

Figure 1:
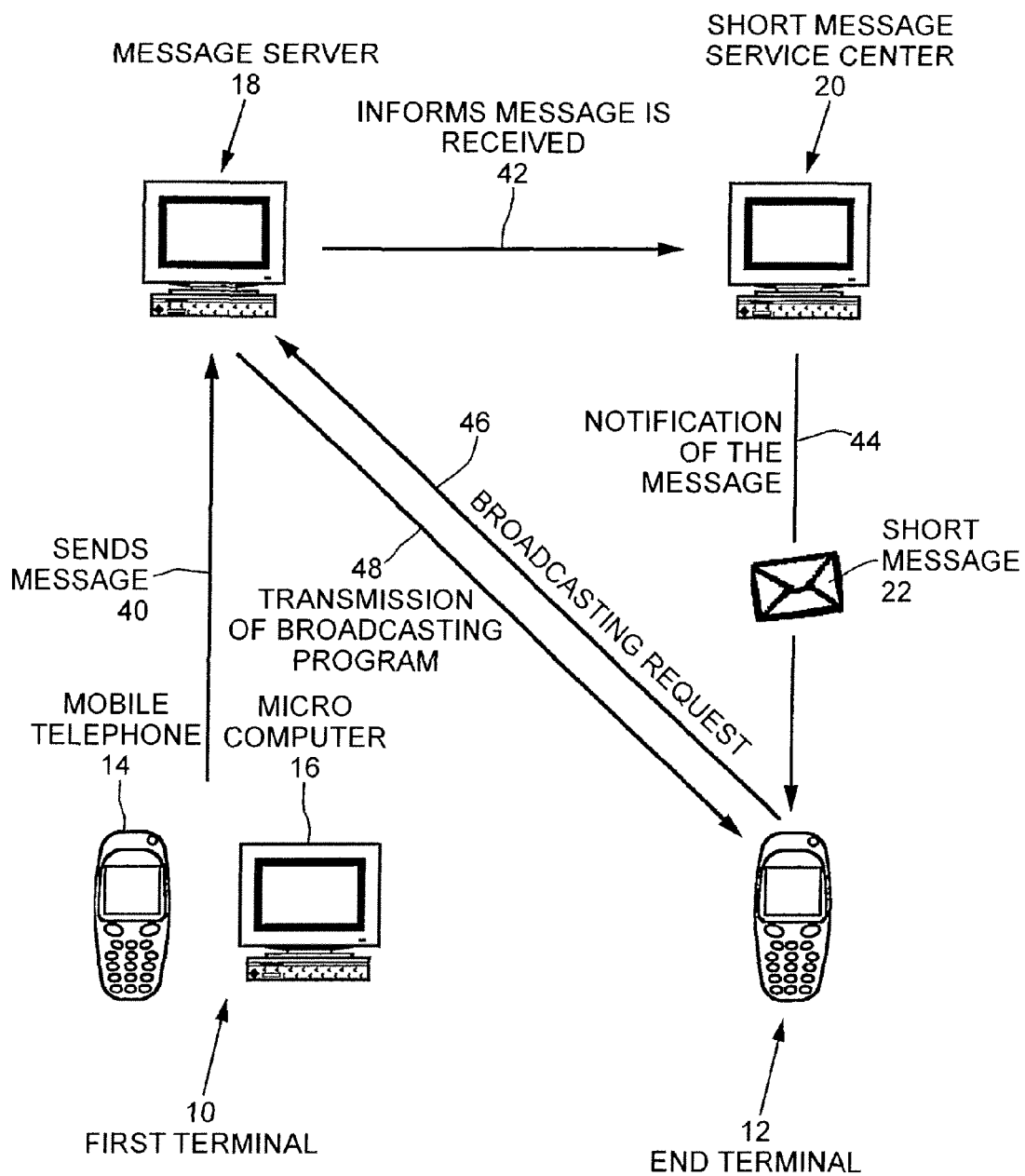
FIG. 1 is a block diagram illustrating the general architecture and the operation of a telecommunications system according to the invention.

In FIG. 1, the general structure of a telecommunications system according to the invention is illustrated. This system is intended for transmitting a multimedia message from a first telecommunications terminal 10 to a second telecommunications terminal 12.

As seen in FIG. 1, the first terminal may consist of any type of terminal capable of communicating with the end terminal 12, and of elaborating and transmitting a multimedia message to this terminal 12. Thus, for example, the first terminal 10 may consist of a mobile telephone set 14, a microcomputer 16 or even a personal assistant (PDA), . . . however the invention is also applied to elaborating and transmitting multimedia messages from a server centre of a service provider.

As regards the second telecommunications set 12, it will be noted that the invention in particular applies to transmitting messages to a mobile telephone set. However, it is conceivable that the invention only applies to elaborating and transmitting multimedia messages to any type of telecommunications sets, such as a personal assistant (PDA) or a fixed telephone set.

As is seen in FIG. 1, the telecommunications system essentially includes a message server 18 intended for receiving messages from the emitting telecommunications set 10 on the one hand, and for giving back this message to the end set 12. The message server 18 communicates with the emitting set 10 and with the end set 12 via the telecommunications network to which the emitting and receiving sets belong respectively. Thus, if the emitting and receiving sets each consist of a mobile telephone set, the message server 18 communicates with the sets via the cellular telephone network.

The telecommunications system is moreover provided with a short message service centre SMSC 20 intended to notify the end terminal 12 of the receipt of a message by the message server 18. For example this notification is performed by means of a short SMS (Short Message Service) message. However it will be noted that such a notification may also be performed by a wap push type service or by electronic mail of the e-mail type, according to the nature of the terminal 12 to which the message is addressed.

To restore the received message, the message server 18 is provided with a compiler providing the creation of a broadcasting program conveying the data to be restored to the addressee, and which is intended to be executed within the end set 12 so as to allow the message to be consulted by a user carrying the set 12.

According to a feature of the invention, this broadcasting program is elaborated as a response to a broadcasting request emitted by the end set 12 and is generated so that the message may be restored according to the characteristics of the set 12.

For this purpose, as this will be described in detail subsequently, the message server 12 includes a database in which, for each type of end mobile, a set of characteristics representative of the particularities and capacities of the set is stored, these characteristics being used for elaborating the broadcasting program. Thus, in response to a download request emitted from the end terminal 12, the message server 18 extracts from the header of the request a field identifying the type of terminal and recovers from the base the corresponding characteristics of the set emitting the request. These characteristics are then used for elaborating a broadcasting program, or for adapting a broadcasting program elaborated beforehand so as to generate through compilation, a broadcasting program which contains the set of instruction codes used for restoring the message by the end set 12 by using the functionalities and the capacities of this set 12.

As indicated earlier, this system allows a multimedia message to be elaborated and transmitted to a remote set 12 preferably consisting of a mobile cellular telephone set. The message is elaborated by an emitting set 10 either consisting of a computer or of a mobile telephone set or even of a server of a service provider. According to these three embodiments, the system operates similarly. Indeed, with reference to FIG. 1 in which arrows illustrate operational phases of a method for transmitting multimedia messages, the system which has just been described, is used in the following way.

To proceed with elaborating a message, multimedia bricks loaded into memory beforehand in the emitting set 10 should be assembled. In the case of using a microcomputer or a mobile telephone set, this assembling may be performed either by means of a web browser as regards the microcomputer 16, or by means of a wap (Wireless Application Protocol) type or web type browser as regards the use of a mobile telephone set. For example, during the creation of the message, the user selects and assembles a sequence of files each corresponding to images or to video and associates each file with text or a sound file. He/she further selects the attractive effects which he/she wishes to provide to his/her message, for example by selecting the changeover mode of the screens, or by programming an activation for each screen of specific functions of the set 12, for example activation of the buzzer, of the back-lighting of the keyboard, and/or of the screen. The message may also be elaborated by means of an application downloaded beforehand with which files may be assembled and the presentation mode of the messages may be defined in order to make the creation of multimedia contents more user-friendly.

Figure 2:
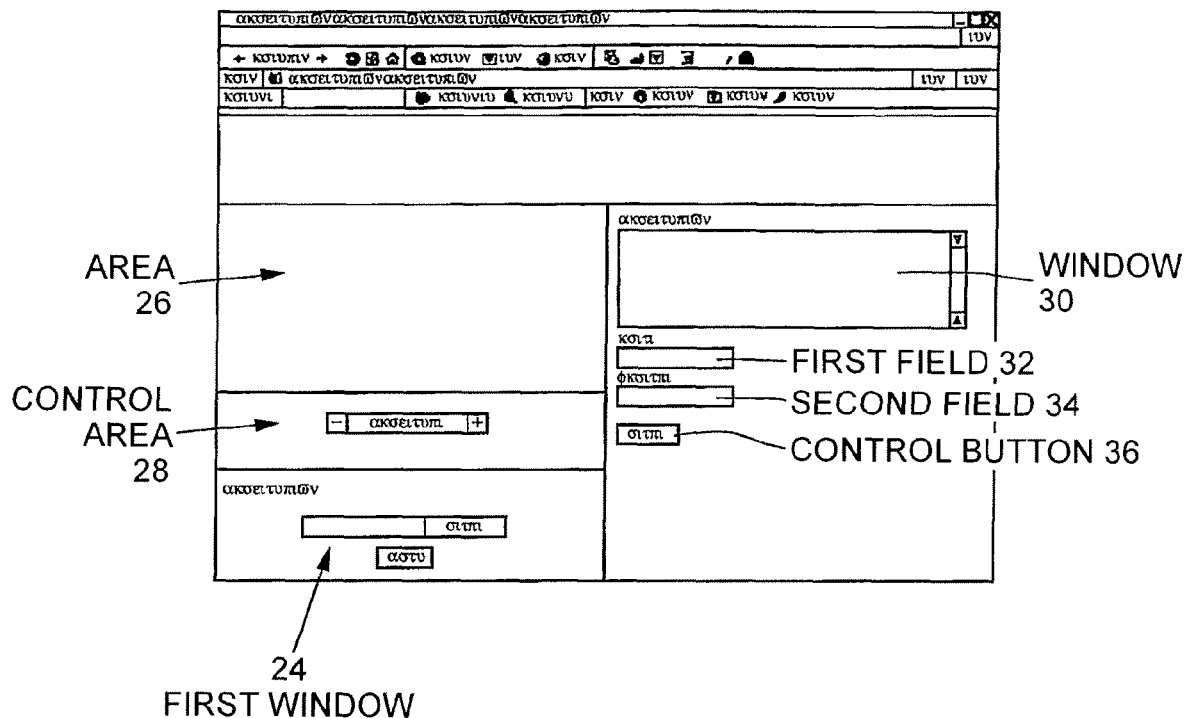
FIG. 2 is a view of a computer screen on which a man-machine interface is displayed, allowing the elaboration of a multimedia message.
Figure 3:
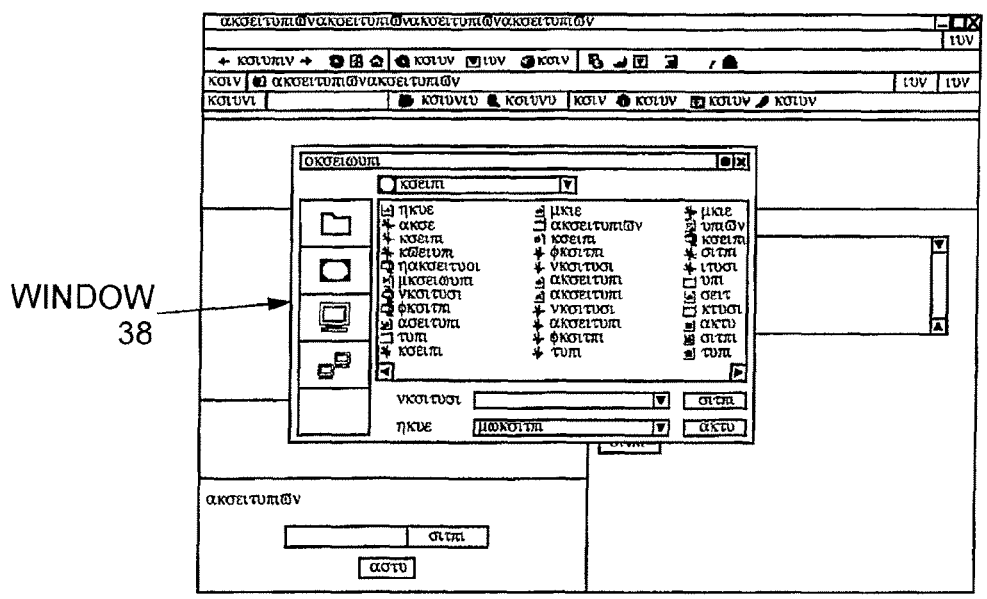
FIG. 3 is a view of the man-machine interface of FIG. 2 used for selecting photographs for elaborating the multimedia message.

As is seen in FIGS. 2 and 3, in which man-machine interface examples used for elaborating a message from the computer 16 are illustrated, a multimedia message to be sent to the mobile set 12 may be generated by means of an interface shown on the screen of the computer 16. Such an interface for example includes a first window 24 used for selecting video contents or an image, associated with an area 26 allowing the video contents or the selected image to be viewed and with a control area 28 allowing the size of the photograph or of the video to be changed. If necessary a window 30 allows a text intended to be superimposed on the images to be entered. It is associated with a first field 32 allowing the name of the addressee to be entered and with a second field 34 allowing the ISDN number of the mobile set 12 to be entered, i.e., the MSISDN number of the addressee. Finally, a control button 36 allows the sending of the message to be controlled.

As is seen in FIG. 3, selecting the window 24 allows access to a window 38 for viewing the set of available files and selecting the contents to be sent.

As indicated earlier, during this phase for elaborating the message, it is also possible to generate a sequence of successive screens each corresponding to one image or to video contents associated with text or with audio contents, and the changeovers of which, for example as cross-fadings, or generally the presentation mode, for example an activation of specific functions of the set 12, are selected by the user.

After creation of the message and actuation of the control button 36, the multimedia contents are sent to the message server 18 (step 40). In response, the message server 18 informs the short message service centre 20 that it has received such a message (step 42). The arrival of such a message is then notified to the remote user or to all the addressees (step 44), as a short message 22.

When the user wishes to read the message, a broadcasting request is then transmitted to the message server 18 (step 46). In response, the server 18 extracts from the header of the broadcasting request, the indication of the terminal type to which the mobile set 12 belongs and then extracts the list of characteristics of the set 12 from the database. The broadcasting program is then compiled from these characteristics and is then transmitted to the end terminal 12 (step 48). Execution of this broadcasting program within the terminal 12 then causes the message to be presented to the addressee and this by using the available functionalities of the terminal 12.

Figure 4:
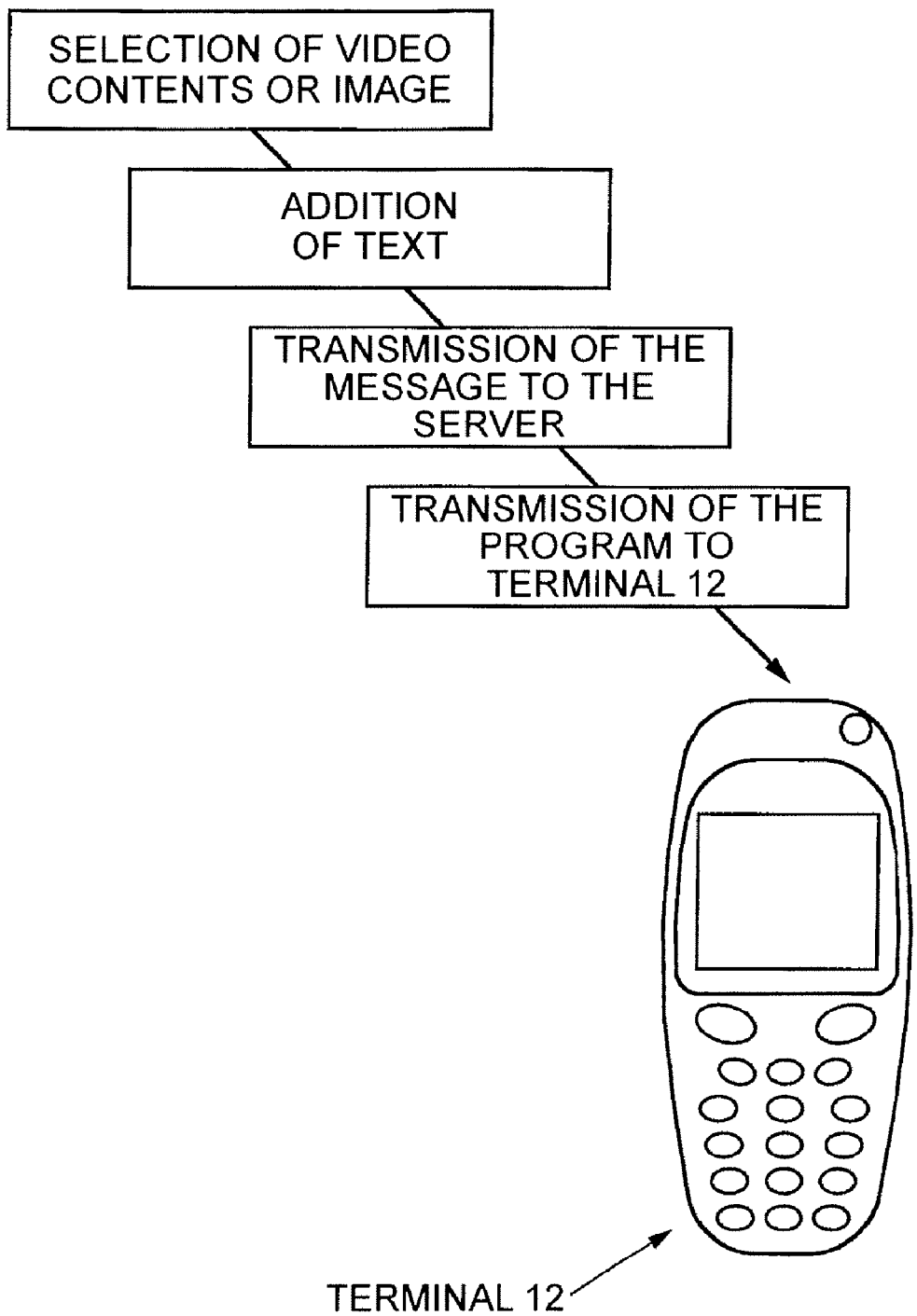
FIG. 4 is a diagram illustrating the elaboration of a multimedia message by means of a mobile cellular telephone set.

With reference to FIG. 4, a similar procedure is used for elaborating and transmitting a multimedia message by means of a mobile cell telephone set 14.

Indeed, this procedure begins with a first step 50 for selecting video contents or an image, followed by a step 52 during which the user adds text to the thereby elaborated message and selects the list of addressees. It will be noted that an interface similar to the one described earlier with reference to FIGS. 2 and 3, but with a simplified structure, may be used for elaborating the message. During the next step 54, the message is sent to the message server which notifies it to the end user via the short message service centre 20. When the remote user wishes to recover the message, a broadcasting request is then automatically sent to the message server 18, which elaborates the broadcasting program and transmits this program to the end terminal 12 (step 56).

As in the exemplary embodiment described earlier with reference to FIGS. 2 and 3, this procedure according to which the message is elaborated from a mobile set, enables messages of different natures to be created, for example a sequence of images or video contents if necessary associated with text information, for which the presentation mode may be predefined, for example by selecting the sequencing mode of the images or by providing activation of the specific functions of the set.

Moreover, the invention which has just been described, also applies to elaborating and transmitting messages by means of any type of telecommunications equipment 10 which is suitable for such an application or of any type of computer equipment 10, such as a server.

It will be noted that the embodiment of the method for transmitting multimedia messages using a server for elaborating and broadcasting such a message is similar to the operating mode described earlier. However, in this case, all the actions are performed in an automated way.

It will also be noted that in the different embodiments described earlier, the elaboration of the broadcasting program may be performed according to different techniques.

Thus, for example, the broadcasting program may be elaborated as a midlet type application developed by means of a specific platform incorporated into the message server. For example, the midlet may consist of a Java® type application generated by means of a J2ME (Java 2 Micro Edition) platform developed by Sun Microsystems, the mobile set being also provided with a corresponding J2ME platform for executing the broadcasting program.

However, such a broadcasting program may also be elaborated by means of other techniques, for example by means of specific platforms such as the Symbian OS® platforms developed by Symbian or Smartphone® developed by Microsoft.

The invention claimed is:

1. A telecommunications system for transmitting multimedia messages from a first telecommunications terminal to a second telecommunications terminal via a telecommunications network, comprising:
   a message server comprising:
   a multimedia message receiver that receives a multimedia message from the first telecommunications terminal,
   a multimedia message transmitter that transmits the message to the second telecommunications terminal,
   a database in which, for each type of a plurality of types of terminals, a set of characteristics of said type of terminal is loaded,
   a request receiver that receives a request from said second terminal, wherein said request comprises a field containing an indication of the terminal type to which said second terminal belongs,
   a request extraction element that extracts said field containing an indication of the terminal type,
   a database extraction element that extracts a set of characteristics of said second terminal from said database by using said indication, and
   an elaboration element that elaborates a program according to the extracted set of characteristics of said second terminal, wherein said program is downloaded by said second terminal and executed on said second terminal in order to present the message transmitted to the second terminal as defined at the first terminal by restoring the message such that message content of the message is not altered prior to presentation.

2. The telecommunications system according to claim 1, further including a short message service centre for transmitting a message notification to the second terminal after the message server has received a message.

3. The telecommunications system according to claim 2, wherein said second terminal, upon receipt of the message notification, sends a message request to the message server that includes a terminal type of the second terminal, the terminal type being used to determine the characteristics of the second terminal.

4. The telecommunications system according to claim 1, wherein said first terminal includes an Internet browser which is used for elaborating messages.

5. The telecommunications system according to claim 1, wherein said first terminal includes, a software application for creating messages, downloaded beforehand, stored in memory in a hardware resource management platform of said first terminal.

6. The telecommunications system according to claim 1, wherein said message server communicates with a database of a telecommunications operator for elaborating said program from data relating to the first terminal or to the bearer of the first terminal, extracted from the database.

7. The telecommunications system according to claim 1, wherein said program includes instruction codes capable of causing a menu to be displayed on a screen of said second terminal, for selecting procedures to be executed by said second terminal, and of initiating execution of said procedures.

8. The telecommunications system according to claim 1, wherein the elaboration element comprises a compiler for creating the program according to the extracted set of characteristics of said second terminal.

9. The telecommunications system according to claim 1, wherein the elaboration element comprises a compiler for adapting a previously created program according to the extracted set of characteristics of said second terminal.

10. The telecommunications system according to claim 1, wherein said program is elaborated by means of a specific platform of said second terminal.

11. A method for transmitting a multimedia message from a first telecommunications terminal to a second telecommunications terminal via a telecommunications network, by means of a telecommunications system including an elaboration element that elaborates a program according to the extracted set of characteristics of said second terminal, wherein said program is downloading by said second terminal and executed on said second terminal in order to present the message transmitted to the second terminal as defined at the first terminal by restoring the message, said method comprising:
    elaborating said message by means of said first telecommunications terminal;
    transmitting said message to said message server;
    transmitting a message notification to said second terminal; receiving a request emitted from the second terminal for said message, wherein said request comprises a field containing an indication of the terminal type to which said second terminal belongs;
    extracting said field containing an indication of the terminal type; using said indication to extract a set of characteristics of said second terminal from a database in which, for each type of a plurality of types of terminals, a set of characteristics of said terminal is loaded; elaborating a program according to said extracted set of characteristics of said second terminal;
    downloading said program to said second terminal;
    transmitting said message from said message server to said second terminal; and
    applying said program to execute on said second terminal to present the message transmitted to the second terminal as defined at the first terminal by restoring the message such that message content of the message is not altered prior to presentation.

12. The telecommunications method according to claim 11, wherein a notification of the message is performed by transmitting a short message via a service center for short messages.

13. The telecommunications method according to claim 11, wherein said program is elaborated from data extracted from a database of a telecommunications operator in which information relative to said first terminal or to the bearer of said first terminal is stored.

14. The telecommunications method according to claim 11, wherein elaborating the program comprises generating the program using a compiler according to the extracted set of characteristics of said second terminal.

15. The telecommunications method according to claim 11, wherein elaborating the program comprises adapting a previously created program using a compiler according to the extracted set of characteristics of said second terminal.

16. A message server comprising:
    a multimedia message receiver that receives a multimedia message from the first telecommunications terminal,
    a multimedia message transmitter that transmits the message to the second telecommunications terminal,
    a database in which, for each type of a plurality of types of terminals, a set of characteristics of said type of terminal is loaded,
    a request receiver that receives a request from said second terminal, wherein said request comprises a field containing an indication of the terminal type to which said second terminal belongs,
    a request extraction element that extracts said field containing an indication of the terminal type,
    a database extraction element that extracts a set of characteristics of said second terminal from said database by using said indication, and
    an elaboration element that elaborates a program according to the extracted set of characteristics of said second terminal, wherein said program is downloaded by said second terminal and executed on said second terminal in order to present the message transmitted to the second terminal as defined at the first terminal by restoring the message such that message content of the message is not altered prior to presentation.

17. The message server according to claim 16, said message server communicating with a database of a telecommunications operator for elaborating said program from data extracted from the database relating to said first telecommunications terminal and to the bearer of said first telecommunications terminal.

18. The message server according to claim 16, said message server including a compiler capable of generating said program for presenting messages, so as to allow a user, bearer of said second end terminal, to consult the restored message.

19. The message server according to claim 16, wherein the elaboration element comprises a compiler for adapting a previously created program according to the extracted set of characteristics of said second terminal.

20. The message server according to claim 16, wherein said program is elaborated by means of a specific platform of said second terminal.

* * * * *